Jan. 2, 1968  R. F. ZIMMERMAN  3,360,925

MULTIPLE SPEED HYDRAULIC CONTROL SYSTEM

Filed Feb. 3, 1966

INVENTOR
RICHARD F. ZIMMERMAN
BY
Richard E. Baskin ATT'Y.

United States Patent Office 3,360,925
Patented Jan. 2, 1968

3,360,925
MULTIPLE SPEED HYDRAULIC CONTROL SYSTEM
Richard F. Zimmerman, Waukegan, Ill., assignor to International Harvester Company, a corporation of Delaware
Filed Feb. 3, 1966, Ser. No. 524,894
6 Claims. (Cl. 60—19)

ABSTRACT OF THE DISCLOSURE

A multiple speed hydraulic steering control system for a tractor loader vehicle with means responsive to a low speed engine throttle setting to direct a high rate of fluid flow to the control system and responsive to a high speed throttle setting to direct a low rate of fluid flow to the control system.

Summary of the invention

This invention relates to steering and implement control systems for tractor loader vehicles and more particularly relates to multiple speed hydraulic steering and implement control systems for such vehicles wherein engine speed regulates the steering and implement speeds.

In a tractor loader vehicle incorporating hydraulic power steering it is often desirable to provide a multiple speed steering control system. Such a system will afford fast steering control at a low vehicle speed and slow steering control at a high vehicle speed. The fast steering control is required throughout the digging and loading cycles at low vehicle speeds. Under such conditions the faster control results in quick and accurate maneuvering. On the other hand a slow steering control is required where the vehicle is operating at a high rate of speed, such as movement between loading sites or during on-highway travel. The slower steering produces better steering "feel" and ensures operating safety under such conditions.

It is also desirable to coordinate the implement speed control with the vehicle or engine speed. Thus at low engine speeds a slow implement speed utilizes the maximum power output from the hydraulic pumps while at high engine speeds a high implement speed results in faster cycling of the implement, such as during cycling between the dumping and digging positions.

Accordingly it is an object of the present invention to provide a multiple speed hydraulic steering control system for a tractor loader vehicle incorporating means responsive to low engine speeds to direct a high rate of fluid flow to the steering control circuit and responsive to high engine speeds to direct a low rate of fluid flow to the steering control circuit.

Another object is to provide a multiple speed control system for a tractor loader vehicle in which first and second sources normally supply fluid under pressure to the steering and implement control circuits, respectively, in which a third source of fluid under pressure directs fluid to the steering control circuit for fast steering control and slow implement control during a low throttle setting of the vehicle engine, and in which the third source directs fluid to the implement control circuit for slow steering control and fast implement control during a high throttle setting of the engine.

Still another object is to provide a multiple speed control system for a tractor loader vehicle in which a two-way valve operates responsive to a low throttle setting of the vehicle engine to direct a high rate of fluid flow to the hydraulic steering control valve and a low rate of fluid flow to the implement control valve, and in which the two-way valve further operates responsive to a high throttle setting of the engine to direct a low rate of fluid flow to the steering control valve and a high rate of fluid flow to the implement control valve.

Other objects and advantages of the present invention will become apparent to those skilled in the art when the following specification is read in conjunction with the accompanying drawings, wherein.

Description of the preferred embodiment

Figure 1:
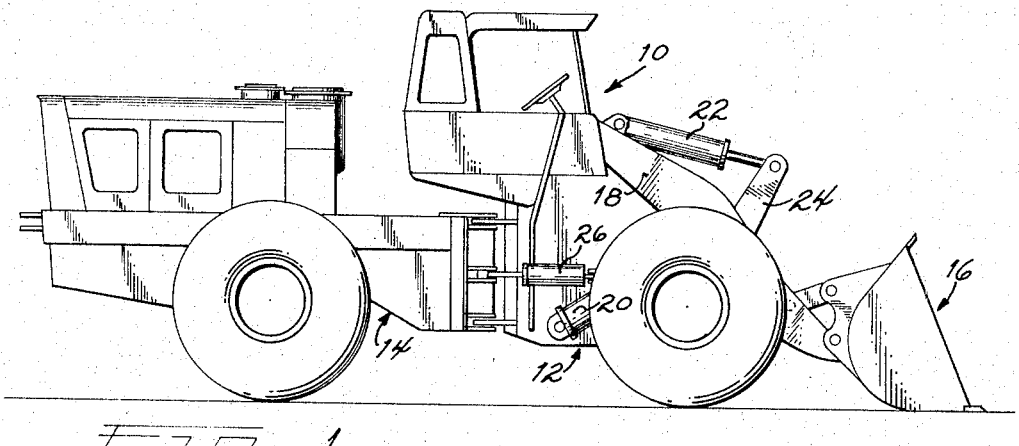
FIGURE 1 is a side elevational view of a tractor loader vehicle of the articulated frame section design incorporating features of the present invention.

Referring now to the drawings and particularly FIGURE 1 the numeral 10 designates an articulated frame tractor loader vehicle. The vehicle 10 comprises a front frame section 12 pivotally connected to a rear frame section 14 about an upright axis. The rear frame 14 supports the vehicle engine (not shown) while the front frame section 12 supports an implement, such as the loader bucket 16 pivotally mounted on the pair of boom arms 18. The boom arms are raised and lowered through operation of a pair of rams 20 while the attitude of the bucket is controlled through operation of ram 22 and conventional rocker arm linkage 24 mounted between the boom arms.

Steering of the vehicle 10 is effected through operation of a pair of hydraulic rams 26 and 27 pivotally connected at their head ends to the front frame 12 and at their rod ends to the rear frame 14.

Figure 2:
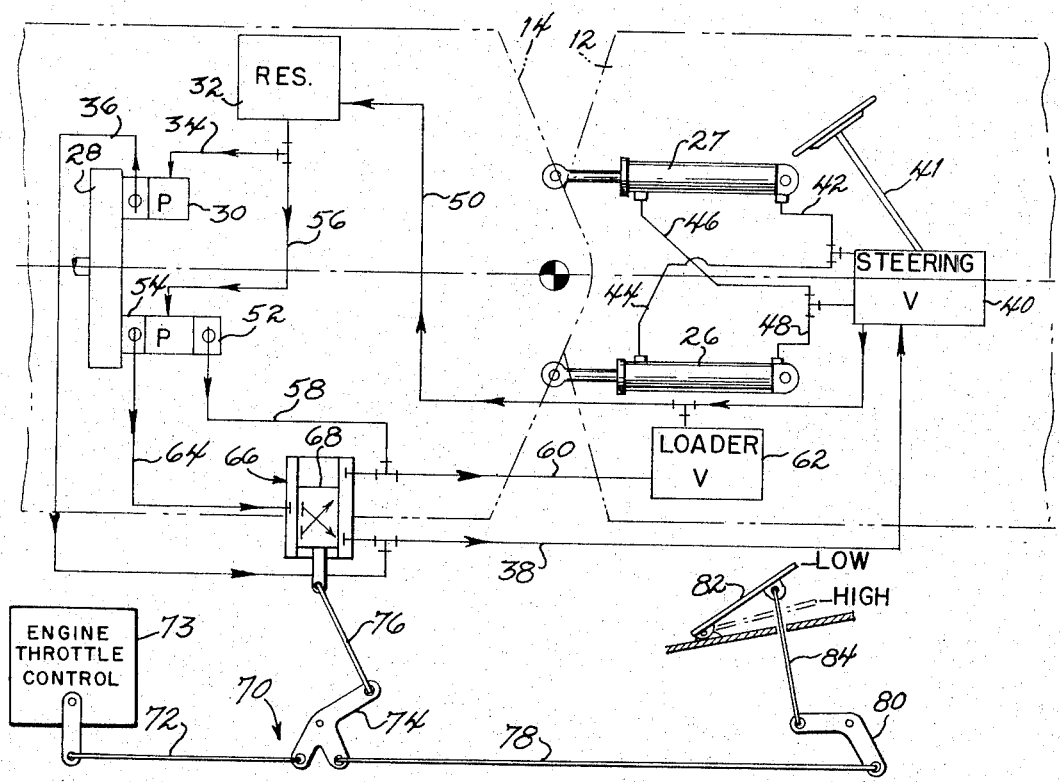
FIGURE 2 is a top plan view of portions of the tractor loader of FIGURE 1 showing the multiple speed steering control system and related elements in a superimposed schematic diagram.

Referring now to FIGURE 2 the frame sections 12 and 14 of the loader vehicle are shown in phantom view. The steering control system of the present invention is illustrated in a superimposed schematic diagram with the respective elements thereof shown in relationship to the frame sections of the vehicle. The power take-off 28 is mounted on the rear frame section 14 and is driven by the vehicle engine (not shown). The power take-off 28 drives a hydraulic pump 30 which receives fluid from reservoir 32 through conduit 34 and delivers fluid under pressure through conduit 36 into conduit 38 and steering control valve 40.

The steering control valve 40 may be of a conventional spool-type construction and operates in response to manipulation of steering wheel 41 to deliver fluid under pressure through conduits 42 and 44 to extend ram 27 and retract ram 26 for a right-hand steering movement, and to deliver fluid under pressure into conduits 46 and 48 to retract ram 27 and extend ram 26 for a left-hand steering movement. Return fluid from valve 40 is delivered through conduit 50 into reservoir 32.

The power take-off 28 further drives a dual hydraulic pump which preferably comprises a pair of vane elements 52 and 54 mounted on a common shaft. The pump element 52 receives fluid from reservoir 32 through conduit 56 and delivers fluid under pressure through conduit 58 into conduit 60 and loader control valve 62. The loader control valve 62 is conventional and is manipulated by the operator to control the operation of boom rams 20 and bucket ram 22 by delivering fluid to such rams through appropriate conduits (not shown). Pump element 52 thus supplies a continuous source of fluid pressure for operation of the bucket or implement.

Pump element 54 withdraws fluid from reservoir 32 through conduit 56 and delivers fluid under pressure through conduit 64 into two-way valve 66. The valve 66 is conventional in construction and incorporates a spool element 68 slidable between first and second positions to direct fluid from conduit 64 into either of the conduits 38 or 60. With the spool element 68 in the first (lower) position, as illustrated in FIG. 2, fluid from pump element 54 is directed into conduit 38 and combined with fluid from pump 30 for delivering into steering control valve 40. With the spool element 68 in the second (upper) position fluid from pump element 54 is directed into conduit 60 and combined with fluid from pump element 52 for delivering into loader control valve 62. The valve 66 may be constructed to deliver a metered amount of flow to the conduits 38 and 60 depending on the extent of travel of spool 68 between its extreme positions. Thus with spool 68 moved to its fully down position a maximum amount of fluid would be delivered into conduit 38 and a minimum amount of fluid would be delivered into conduit 60. As spool 68 moves upward, a decreasing amount of fluid would be delivered into conduit 38 with an increasing amount of fluid delivered into conduit 60 depending on the extent of travel of the spool.

The two-way valve 66 is controlled through operation of throttle linkage 70. The linkage 70 comprises control link 72 which is connected at one end to throttle control 73 of the vehicle engine and at its other end to an arm of bellcrank lever 74 which is mounted on rear frame 14. A link 76 operably connects bellcrank 74 with the spool 68. A flexible cable 78 is connected at one end to a depending arm of bellcrank 74 and at its other end to an arm of bellcrank 80 which is mounted on the front frame 12. The flexible cable 78 permits throttle control between the frame sections throughout articulated steering movements. The angular positions of the bellcrank 74 and 80 are controlled through operator manipulation of foot lever 82 by means of a link 84 interconnecting lever 82 with an arm of bellcrank 80.

With the foot lever 82 in the low speed position, as illustrated in FIG. 2, the throttle linkage 70 will effect a low speed throttle setting of the engine and simultaneously operate the spool 68 of valve 66 into the first or lower position shown in the drawing. The two-way valve 66 will now operate to combine flow from pump element 54 with flow from pump 30 to produce a high flow rate into steering control valve 40. This will result in fast steering operation of rams 26 and 27 during low engine speeds. At this time the loader control valve 62 is supplied solely by pump element 52 for low speed operation of the implement.

With the foot control 82 in the high speed position the throttle linkage 70 will affect a high speed throttle setting of the engine while simultaneously operating spool 68 of valve 66 into the second or upper position. Flow from pump element 52 will now be combined with flow from pump 54 to produce a high flow rate into loader control valve 62 for high speed operation of boom rams 20 and bucket ram 22. With the valve 66 in this position only fluid from pump 30 is delivered into steering control valve 40 for low speed steering operation.

It is apparent that applicant has provided a multiple speed hydraulic control system which coordinates steering and implement control in relationship to engine throttle setting. Thus at a low throttle setting a high rate of fluid flow is directed to the steering rams for fast steering while a low rate of fluid flow operates the implement rams. At a high throttle setting applicant's invention provides low speed steering and high speed implement control.

It will be understood that various changes in the details and arrangement of parts, which have been described and illustrated in order to explain the nature of the invention, may be made by those skilled in the art within the principle and scope of the invention as expressed in the appended claims.

What is claimed is:

1. In a multiple speed hydraulic control system for a tractor loader vehicle driven by an engine and having hydraulic steering and implement motors, the combination of: first means to supply fluid under pressure to the steering motor; second means to supply additional fluid under pressure; valve means operable in a first position to fluidly connect the first and second means in parallel flow for high speed operation of the steering motor; and, control means for varying the speed of the engine between maximum and minimum values, the control means further operating the valve means to the first position responsive to a substantially minimum engine speed.

2. A multiple speed hydraulic control system as defined in claim 1 wherein: the control means includes linkage means for selectively varying the throttle setting of the engine between maximum and minimum values, the linkage means further being connected to operate the valve means to the first position responsive to a substantially minimum throttle setting.

3. A multiple speed hydraulic control system as defined in claim 1 and further including: third means to supply fluid under pressure to the implement motor; the valve means being operable to a second position by the control means responsive to a substantially maximum engine speed to fluidly connect the second and third means in parallel flow for high speed operation of the implement motor.

4. A multiple speed hydraulic control system as defined in claim 3 wherein: the control means includes linkage means for selectively varying the throttle setting of the engine between maximum and minimum values, the linkage means further being connected to operate the valve means to the first and second positions responsive to substantially minimum and maximum throttle settings, respectively.

5. A multiple speed hydraulic control system as defined in claim 3 wherein: the valve means includes a spool operable with the valve in the first position to direct fluid from the second means to the steering motor, and with the valve in the second position to direct fluid from the second means to the implement motor.

6. A multiple speed hydraulic control system as defined in claim 5 wherein: the control means includes an operator controlled throttle linkage operably connected with the throttle of the engine, and a control link operably connecting the throttle linkage with the spool, the link being sized and arranged to operate the valve to the first position with the throttle at a low setting and to the second position with the throttle at a high setting.

References Cited

UNITED STATES PATENTS 2,103,530   12/1937   Henry _____ 60—52 X

EDGAR W. GEOGHEGAN, *Primary Examiner.*